United States Patent
Coman et al.

(10) Patent No.: US 12,217,008 B2
(45) Date of Patent: Feb. 4, 2025

(54) MODIFYING DYNAMIC CONVERSATIONAL RESPONSES BASED ON DETECTING REFERENCES TO SOCIALLY CLOSE PEOPLE

(71) Applicant: Capital One Services, LLC, McLean, VA (US)

(72) Inventors: Alexandra Coman, Tysons Corner, VA (US); Chihyen Yang, Hoboken, NJ (US); Rui Zhang, New York, NY (US); Jihoon Jay Song, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 527 days.

(21) Appl. No.: 17/677,087

(22) Filed: Feb. 22, 2022

(65) Prior Publication Data

US 2023/0267279 A1    Aug. 24, 2023

(51) Int. Cl.
  *G06F 40/35*   (2020.01)
  *G06F 16/332*  (2019.01)
  *G06F 40/279*  (2020.01)
  *G06N 3/04*    (2023.01)
  *G06N 3/084*   (2023.01)

(52) U.S. Cl.
  CPC .......... *G06F 40/35* (2020.01); *G06F 16/3329* (2019.01); *G06F 40/279* (2020.01); *G06N 3/04* (2013.01); *G06N 3/084* (2013.01)

(58) Field of Classification Search
  CPC .... G06F 40/35; G06F 40/279; G06F 16/3329; G06N 3/04; G06N 3/084
  See application file for complete search history.

(56) References Cited

U.S. PATENT DOCUMENTS

2006/0248573 A1* 11/2006 Pannu .................. H04L 63/08
                                          726/1

* cited by examiner

*Primary Examiner* — Daniel C Washburn
*Assistant Examiner* — Athar N Pasha
(74) *Attorney, Agent, or Firm* — FOLEY & LARDNER LLP

(57) ABSTRACT

Methods and systems are described for generating dynamic conversational responses sensitive to different emotional contexts using machine learning models. The dynamic conversational responses may be generated in real time and reflect the likely emotional context by detecting socially close entities and events in user input.

20 Claims, 5 Drawing Sheets

MODIFYING DYNAMIC CONVERSATIONAL RESPONSES BASED ON DETECTING REFERENCES TO SOCIALLY CLOSE PEOPLE

BACKGROUND

In recent years, the amount and uses of interactive communication programs (sometimes referred to as chatbots) has risen considerably. For example, many web pages now enable a user to get help using a chatbot that can answer certain questions. Those chatbot responses may take the form of text responses, speech responses, or both. In tandem with the rise of these interactive communication programs, there arose a need to have these communication programs include responses that are more human-like, for example, responses that mimic speech/response patterns of humans.

SUMMARY

Methods and systems are described herein for generating dynamic conversational responses sensitive to different emotional contexts. Generally, conversational responses include communications between a user and a system. The system may be referred to as a conversational system. In some cases, the conversational system may respond using audio and may maintain a human-like conversational tone, cadence, and/or speech pattern during an interactive exchange. In some cases, the conversational system may respond using text output that may attempt to emulate a human. In both cases, the conversational system may be improved if the system is able to infer a user's mental state. The conversational system may infer the user's mental state from detecting (1) the user mentioning, in the user's interaction, a socially close person and (2) the context that the socially close person is mentioned in. The context may be determined, for example, with term recognition algorithms. Based on identifying the socially close person and the context, the conversational system may adjust the language of responses using a machine learning model and/or other method(s).

For example, a user may be interacting with a conversational system by typing questions/requests in a conversation window. The user may express a desire to find out how much money the user is able to withdraw because he/she needs to pay for funeral expenses for his/her grandmother. The conversational system may detect the term "grandmother" in the question as a socially close person and the term "funeral" as a context. As a result, the conversational system may provide the answer to the user's question and offer condolences to the person and/or adjust the language of the response to a somber tone.

Thus, in some embodiments, the conversational system may perform the following operations when generating dynamic conversational responses sensitive to different emotional contexts. The conversational system may receive a user input, from a user, during a conversational interaction with a user interface. For example, the user may type a question/request into a visual interface, or the user may speak into a microphone which may receive the audio data and pass on the audio data and/or translate the audio data into text.

When the input is received, the conversational system may identify, in the user input, a term that matches a stored term with an associated social closeness value. Social closeness could be approximated in various ways, e.g., through rule-based approaches, case-based reasoning, and/or machine learning. For the purposes of a rule-based approach, one may assume a generic set of rules can be assembled to roughly articulate such distinctions for a population or culture (e.g. it might be assumed that people tend to be closer to their grandmother than to their work colleagues). Examples of utterances about people with varying degrees of closeness to the customer: "I heard a story about a person who injured themselves while using this product and want to avoid that" (lower social closeness) vs. "My sister injured herself while using this product" (higher social closeness). The associated social closeness value may indicate a social distance between the user and an entity represented by the stored term. For example, the conversational system may detect the term "grandmother" which may have a high associated closeness value. In another example, the conversational system may detect the term "neighbor" which may have a lower associated closeness value. Other examples may include terms like "pets" or types of animals, family members (e.g., "husband", "daughter", "son", "wife", etc.). Each term may have a corresponding associated closeness value.

In addition, the conversational system may determine, using the user input, an emotional context associated with the user. For example, the conversational system may use the terms (e.g., words and/or phrases) in the user input to determine the emotional context. For example, the emotional context may be "sadness" (e.g., if the user input contains the term "funeral") or happiness (e.g., if the user input contains the term "wedding"). Other emotional contexts may include fear, anger, anxiety, confusion, disgust, etc.

The conversational system may then generate a feature input based on one or more of: the user input, the term, the emotional context, and the associated social closeness value. The feature input may be a vector representation of any combination of any of these. The conversational system may input the feature input into a machine learning model and/or other method(s) to obtain a dynamic conversational response from a plurality of dynamic conversational responses based on the feature input. For example, if the user inputs "I need to get my account balance so I can pay for funeral expenses for my grandmother," the conversational system may determine that the term is "grandmother", and the context is "sadness". The system may then determine a social closeness value associated with the term "grandmother" and input all that data into a machine learning model together with the input itself. The machine learning model and/or other method(s) may generate an indication of the response to the query and an indication of language to be used in combination with the response.

The conversational system may provide, at the user interface, the dynamic conversational response selected/generated by the machine learning model and/or other method(s) during the conversational interaction. For example, the conversational system may respond with the balance of the account and in addition include language that offers condolences to the user. In some instances, the conversational system may select additional language that may be related to funerals. For example, the conversational system may output data (e.g., textual, audio, etc.) that may help the user with funeral arrangements (e.g., funeral homes, flowers, etc.).

In some embodiments, the conversational system may determine an emotional context using another machine learning model and/or other method(s). For example, the conversational system may input the user input into a machine learning model and/or other method(s) to identify an event associated with the input. In this case, the event may be a funeral. Other events may include graduations, weddings, etc. Each event may be associated with a particular emotional context. Thus, the conversational system may determine an associated emotional context based on the identified event.

In some embodiments, the conversational system may be used to not only adjust for the emotional state of the user, but also help identify opportunities for additional service. For example, if the system receives an input from the customer stating "My sister received the right-handed version of this product and I would like to make sure this does not happen when I order the product, because I'm left-handed just like her," the conversational system may identify the terms in the input and determine that the user's profile should be updated to add that the user is left-handed. In some embodiments, the conversational system may identify an account associated with the user's sister and may offer to expedite the return of the product and/or an exchange for the correct version. The conversational system may perform these operations by identifying terms within the conversational queries from the users.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of this disclosure. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
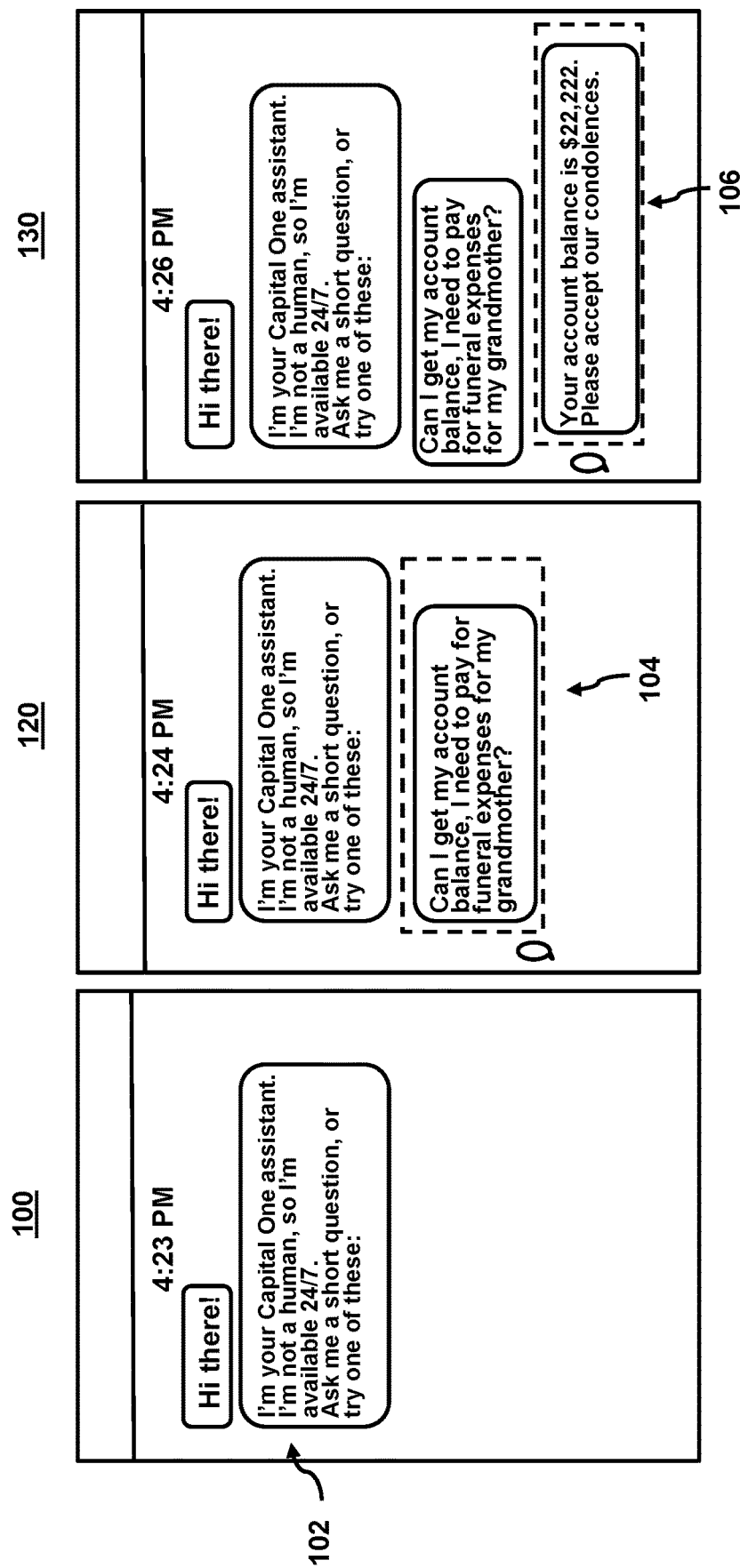
FIG. 1 shows an illustrative user interface for presenting dynamic conversational responses using machine learning models, in accordance with one or more embodiments of this disclosure.

FIG. 1 shows an illustrative user interface for presenting dynamic conversational responses using machine learning models, in accordance with one or more embodiments. For example, FIG. 1 shows user interfaces 100, 120, and 130. The conversational system (e.g., via a mobile application) may generate and respond to user interactions in the user interfaces (e.g., user interfaces 100, 120, and 130) in order to engage in a conversational interaction with the user. The conversational interaction may include a back-and-forth exchange of ideas and information between the system and the user. The conversational interaction may proceed through one or more mediums (e.g., text, video, audio, etc.).

The conversational system may generate prompt 102 upon activation inviting the user to type in a question or a request. Although prompt 102 is shown as a visual output (e.g., on a display screen), prompt 102 may be an audio output (e.g., via one or more speakers). In some embodiments, prompt 102 may be an audio-visual prompt. The conversational system may receive a user input (e.g., user input 104) from a user, during a conversational interaction with a user interface. Although user input 104 is shown as a text input, user input 104 may be audio, visual, or audio-visual. For example, the user may speak his/her input into a microphone associated with a user device and that input may be communicated to the conversational system.

In some embodiments, the conversational system may process user input 104 to generate dynamic conversational responses sensitive to different emotional contexts using machine learning models. An exemplary conversational system is illustrated within ecosystem 200 of FIG. 2. Conversational system 202 may include communication subsystem 212, processing subsystem 214, machine learning subsystem 216, and output subsystem 218. Ecosystem 200 may also include data node 204 that may store training datasets and/or other data (e.g., in databases). Ecosystem 200 may also include user device 206 that enables user input as described below. Conversational system 202, data node 204, and user device 206 may be connected by network 250 (e.g., the Internet, intranet, or a combination of both).

The conversational system may receive a user input, from a user, during a conversational interaction with a user interface. The user input may be received via communication subsystem 212 from a device associated with the user. Communication subsystem 212 may include software components, hardware components, or a combination of both. For example, communication subsystem 212 may include a network card (e.g., a wireless network card and/or a wired network card) that is coupled with software to drive the card. When the user input is received, communication subsystem 212 may pass the received user input to processing subsystem 214.

Figure 3:
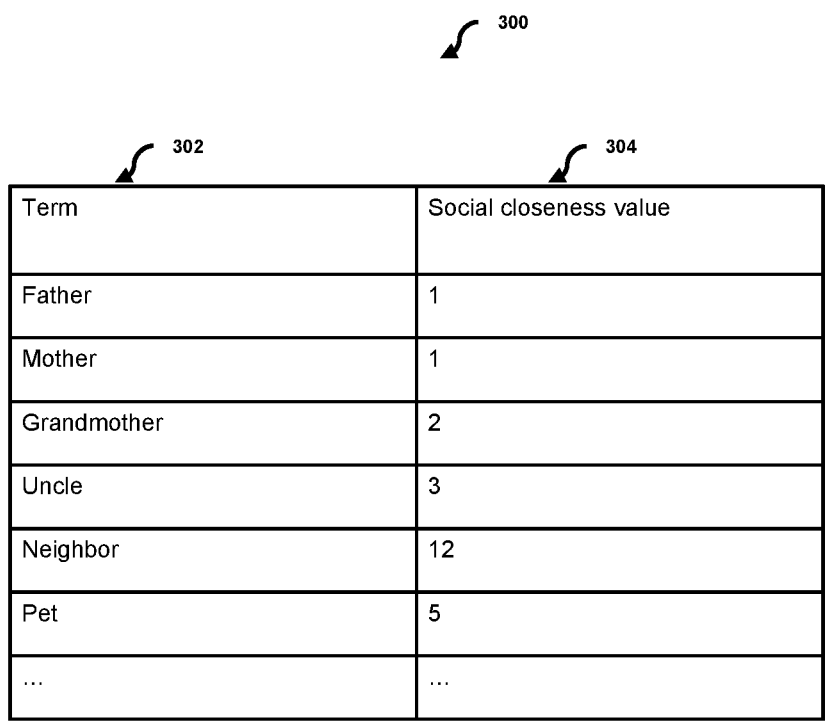
FIG. 3 illustrates an exemplary table for storing terms and social closeness values in accordance with one or more embodiments of this disclosure.

Processing subsystem 214 may include hardware components, software components, or a combination of both. For example, processing subsystem 214 may use processor(s), memory, and software to use those hardware components. Processing subsystem 214 may identify, in the user input, a term that matches a stored term with an associated social closeness value. The associated social closeness value may indicate a potential social distance between the user and an entity represented by the stored term. For example, a term such as "grandmother" or "mother" may have a higher social closeness value than the term "neighbor". FIG. 3 illustrates an exemplary table 300 that may store terms and social closeness values. Column 302 stores the terms, while column 304 stores the corresponding social closeness values. Although the social closeness values are displayed as integer values, other data types to store social closeness values may be used (e.g., percentages, ratios, or other types of values).

Thus, in some embodiments, processing subsystem 214 may compare a plurality of terms within the user input with a plurality of stored terms. Each term of the plurality of stored terms may be associated with a corresponding social closeness value, and a particular social closeness value may indicate a social distance between the user and an entity represented by a corresponding stored term (as illustrated in FIG. 3). For example, processing subsystem 214 may select each term within the input and compare those terms with stored terms (e.g., sequentially or in parallel) to determine whether any of the terms within the user input match a stored term. If processing subsystem 214 finds a match, processing subsystem 214 may retrieve the social closeness value associated with the term. As referred to herein, "term" refers to a word or phrase. Thus, in some embodiments, processing subsystem 214 may execute a function to split the user input into terms.

Data processing subsystem 214 may determine, using the user input, an emotional context associated with the user. Data processing subsystem 214 may make the determination using various operations. For example, data processing subsystem 214 may compare the terms within the user input with stored terms that have a stored emotional context. For example, the term "funeral" may be associated with "sadness" as an emotional context. The term "graduation" may be associated with "happiness" as an emotional context. Those terms may be pre-stored and data processing subsystem 214 may compare those pre-stored terms with terms within the user input.

In some embodiments, data processing subsystem 214 may use an additional machine learning model to determine an emotional context associated with the user input. For example, data processing subsystem 214 may input the user input into a second machine learning model that is trained to identify context from the user input. The additional machine learning model may be trained to identify the context using a training dataset. For example, a training dataset may be used that includes statements (e.g., various user inputs) and labels (e.g., emotional contexts) associated with those statements to train the model. In some embodiments, the additional (second) machine learning model may be trained using a training dataset that includes "terms" and associated labels for those terms. For example, the term "wedding" may be labeled "happy" as a corresponding context, while the term "funeral" may have an associated label of "sad." Other terms may be included in the training dataset with the associated labels (e.g., "wedding reception", "graduation", "graduation ceremony", etc.).

In some embodiments, the additional (second) machine learning model may be trained to identify an event associated with the user input. Thus, data processing subsystem 214 may input the user input into a second machine learning model, where the second machine learning model is trained to identify events from user input. Prior to input, data processing subsystem 214 may split the user input into terms and generate a vector for input into the machine learning model using those terms. The machine learning model may be trained using a training dataset to identify the events. For example, the training dataset may include a plurality of terms (e.g., "wedding", "wedding reception", "graduation", "graduation ceremony", "funeral", "wake", etc.) and corresponding labels (e.g., "graduation", "funeral", "wedding", etc.). The additional (second) machine learning model may be trained using that training dataset.

Data processing subsystem 214 may receive, from the second machine learning model, an identifier of an event associated with the user input. For example, if the user input states, "I need to buy my sister a graduation present," the machine learning model trained to identify events may identify a graduation as the event associated with the user input. Data processing subsystem 214 may determine the emotional context associated with the event.

For example, data processing subsystem 214 may compare an identifier associated with the event (e.g., event name) with a plurality of pre-stored events. Each pre-stored event may have an associated emotional context. Thus, when data processing subsystem 214 identifies a matching event, data processing subsystem 214 may retrieve an emotional context value (e.g., happiness, sadness, etc.) associated with the event.

In some instances, identifying an event using a machine learning model may be more advantageous than performing term matching on the user input. For example, the user may state "I need to buy a gift for a diploma ceremony." In this instance, it may be possible that the event "diploma ceremony" may not be part of the listed events. However, a machine learning model may still recognize that a "diploma ceremony" may be equivalent to "graduation."

Processing subsystem 214 may generate a feature input based on the term, the emotional context, and the associated social closeness value. For example, processing subsystem 214 may generate a vectorized representation of the user input, the emotional context and the associated closeness value. The vectorization operation may be performed by another machine learning model. Processing subsystem 214 may pass the feature input to machine learning subsystem 216.

Machine learning model subsystem 216 may input the feature input into a first machine learning model to obtain a dynamic conversational response from a plurality of dynamic conversational responses based on the feature input. For example, the machine learning model may output a plurality of possible interpretations of the user's query and a corresponding probability for each interpretation. In addition, the machine learning model may output an indication of additional response language to be used in responding to the user. For example, the machine learning model may output an indication that there is a 90% probability that the user is asking for an account balance and may also output an indication that a particular language template (e.g., including language that is sensitive to the particular determined emotional context) should be used to deliver the results to the user. For example, the system may include a plurality of language templates for a plurality of emotional contexts and a plurality of socially close entities. The machine learning model may output a template identifier suitable for the combination of the socially close entity and the emotional context provided. The machine learning model may be trained using the template identifiers for a socially close entity and the emotional contexts.

In some embodiments, machine learning subsystem 216 may receive, from the first machine learning model, a plurality of probable contexts and a plurality of corresponding probabilities. Machine learning subsystem 216 may receive a context of "sadness" with a probability of 75% and a context of "anger" with a probability of 50%. Machine learning subsystem 216 may select, from the plurality of probable contexts, one or more contexts with highest probabilities. In some embodiments, machine learning subsystem 216 may select one context with the highest probability (e.g., sadness with a 75% probability), while in other embodiments, machine learning subsystem 216 may select multiple contexts with the highest probabilities (e.g., when probabilities are within a specific threshold value of each other). For example, if the "sadness" context and the "anger" context are within a particular percentage (e.g., within 5%), machine learning subsystem 216 may select both of those contexts.

Machine learning subsystem 216 may then select conversational data based on the one or more contexts. For example, machine learning subsystem 216 may select a template for the one or more contexts selected. Machine learning subsystem 216 may then update the dynamic conversational response with the conversational data. For example, if machine learning subsystem 216 determines that the context is "sadness" and it is determined that the user is asking about his/her account balance, machine learning subsystem 216 may select a template associated with the "sadness" context. However, if machine learning subsystem 216 determines that the context is "sadness" and "anger" and it is determined that the user is asking about his/her account balance, machine learning subsystem 216 may select a template associated with the "sadness" and "anger" contexts.

Machine learning subsystem 216 may then update the dynamic conversational response with the conversational data. Machine learning subsystem 216 may make the update using the following operations. Machine learning subsystem 216 may compare each response term with a plurality of contextual terms. In response to determining that a response term should be replaced with a contextual term of the plurality of contextual terms, machine learning subsystem 216 may replace the response term with the contextual term. For example, if the conversation response includes a phrase "Have a nice day," machine learning subsystem 216 may replace that phrase with "My condolences" in the case where a user's socially close person has died.

Machine learning subsystem 216 may pass the conversational response to output subsystem 218. Output subsystem 218 may receive the conversational response and generate and/or display, at the user interface, the dynamic conversational response. For example, the output subsystem may determine a type of user interface that is being used by the user (e.g., graphical, audio, or a combination of the two) and adopt the conversational response based on the user interface. Thus, in response to determining that the user interface is graphical, output subsystem 218 may generate for display the conversational response as text. In response to determining that the user interface is voice based, output subsystem 218 may adapt the conversational response into a voice output and output the conversational response using a speaker. For example, output subsystem 218 may generate for display output 106 (FIG. 1).

Figure 4:
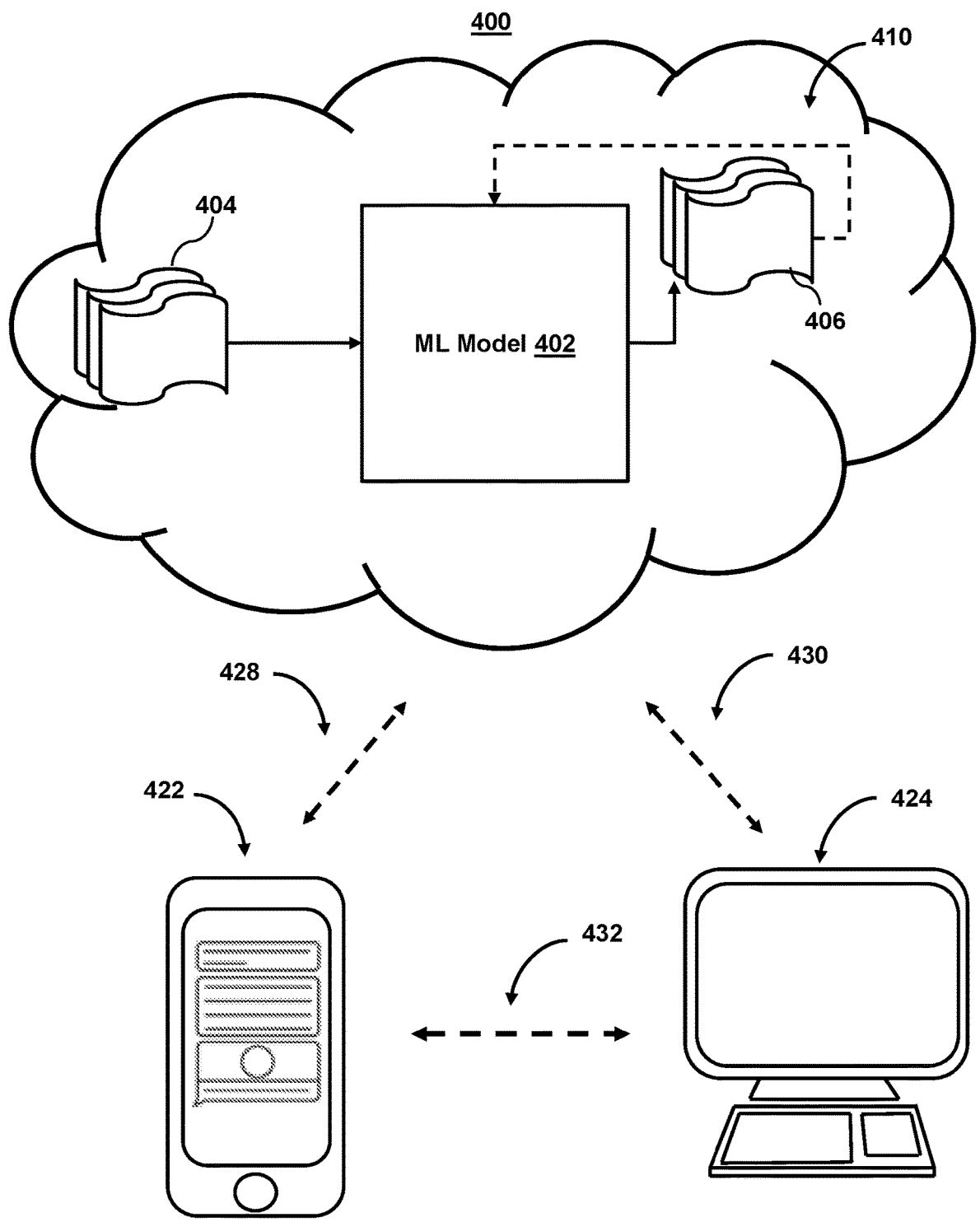
FIG. 4 is an illustrative machine learning environment for generating dynamic conversational responses using a machine learning model, in accordance with one or more embodiments of this disclosure.

FIG. 4 is an illustrative system for generating dynamic conversational responses using a machine learning model, in accordance with one or more embodiments. For example, system 400 may represent the components used for generating dynamic conversational responses as shown in FIG. 1. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., based on recommended contact strategies).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating dynamic conversational responses using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 4G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior transactions. Alternatively, or additionally, the system may act as a clearinghouse for multiple sources of information about the user. Cloud components 410 may also include control circuitry configured to perform the various operations needed to generate responses. For example, the cloud components 410 may include cloud-based storage circuitry configured to store a first machine learning model that is trained to select a dynamic conversational response from a plurality of dynamic conversational responses based on first feature input. Cloud components 410 may also include cloud-based control circuitry configured to determine an intent of the user based on a machine learning model. Cloud components 410 may also include cloud-based input/output circuitry configured to generate the dynamic conversational response during a conversational interaction.

Cloud components 410 include machine learning model 402. Machine learning model 402 may take inputs 404 and provide outputs 406. The inputs may include multiple datasets, such as a training dataset and a test dataset. Each of the plurality of datasets (e.g., inputs 404) may include data subsets related to user data, contact strategies, and results. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). For example, the system may receive a first labeled feature input, wherein the first labeled feature input is labeled with a known dynamic conversational response for the first labeled feature input. The system may then train the first machine learning model to classify the first labeled feature input with the known dynamic conversational response.

In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

In some embodiments, machine learning model 402 may include an artificial neural network (e.g., as described in FIG. 4 below). In such embodiments, machine learning model 402 may include an input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 402 may correspond to a classification of machine learning model 402 and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free-flowing, with connections interacting in a more chaotic and complex fashion. During testing, an output layer of machine learning model 402 may indicate whether or not a given input corresponds to a classification of machine learning model 402.

In some embodiments, model 402 may predict a goal or intent of a user. This goal or intent may be selected from a plurality of goals and/or intents stored by the system. For example, the system may determine that users who ask different questions about payment have similar account information and digital activities. In some embodiments, the model (e.g., model 402) may automatically perform actions based on output 406.

In some embodiments, machine learning model 402 may be a machine learning model that determines a socially close entity. In some embodiments, a second machine learning model 402 may be used to determine a context associated with the user input. Input 404 may be a vector generated based on the user input (e.g., including a social closeness value, one or more terms, and/or the event), and output 406 may be an output that indicates the context of the user input. In some embodiments, input 404 may be input into the additional (second) machine learning model that may determine an event and/or context.

Figure 2:
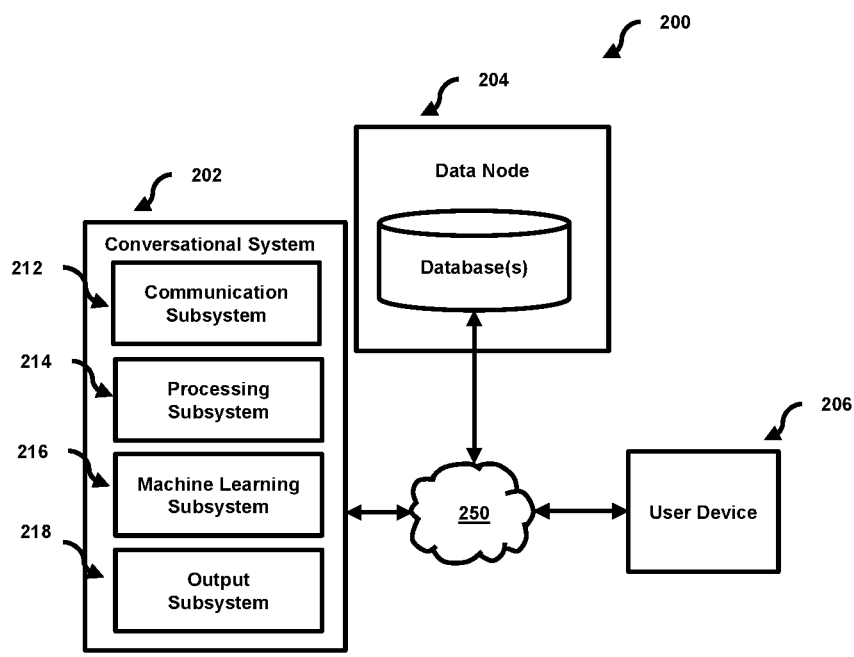
FIG. 2 is an illustrative system for generating dynamic conversational responses using a machine learning model, in accordance with one or more embodiments of this disclosure.
Figure 5:
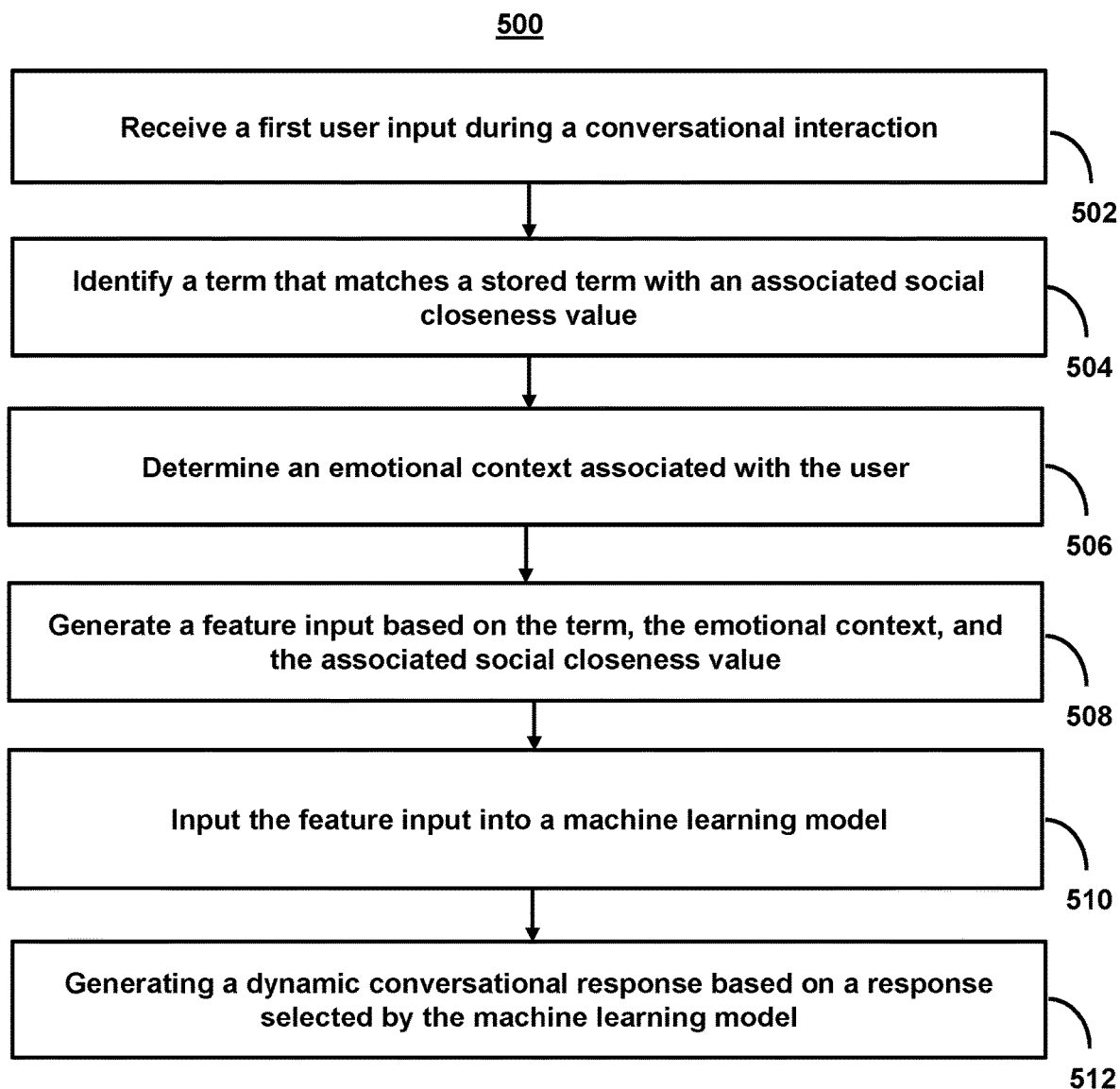
FIG. 5 shows a flowchart of the steps involved in generating dynamic conversational responses using a machine learning model and/or other method(s), in accordance with one or more embodiments of this disclosure.

FIG. 5 shows a flowchart of the steps involved in generating dynamic conversational responses using a machine learning model, in accordance with one or more embodiments. For example, process 500 may represent operations by one or more components as shown in FIG. 2 when generating dynamic conversational responses using one or more machine learning models (e.g., as shown in FIG. 4). At 502, process 500 (e.g., using one or more components in system 400 (FIG. 4)) receives a first user input during a conversational interaction. For example, the system may receive, using control circuitry, a user action, from a user, during a conversational interaction with a user interface. For example, the system may receive a user action as described in FIGS. 1-2.

At 504, process 500 (e.g., using one or more components in system 400 (FIG. 4)) identifies a term that matches a stored term with an associated social closeness value. For example, the system may perform the identification operation, using the control circuitry. At step 506, process 500 (e.g., using one or more components in system 400 (FIG. 4)) determines an emotional context associated with the user. For example, process 500 may use a machine learning model of FIG. 4 or another suitable component. At 508, process 500 (e.g., using one or more components in system 400 (FIG. 4)) generates a feature input based on the term, the emotional context, and the associated social closeness value. For example, the system may generate, using the control circuitry, the feature input.

At 510, process 500 (e.g., using one or more components in system 400 (FIG. 4)) inputs the feature input into a machine learning model. For example, the system may input, using the control circuitry, the feature input into a machine learning model (e.g., machine learning model of FIG. 4). The machine learning model may be trained to select a dynamic conversational response from a plurality of dynamic conversational responses based on the feature input. At 512, process 500 (e.g., using one or more components in system 400 (FIG. 4)) generates a dynamic conversational response based on a response selected by the machine learning model. For example, the system may generate and/or display, at the user interface, the dynamic conversational response based on a response selected by a machine learning model during the conversational interaction.

It is contemplated that the steps or descriptions of FIG. 5 may be used with any other embodiment of this disclosure. In addition, the operations and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses sensitive to different emotional contexts using machine learning models, the method comprising: receiving a first user input from a user during a conversational interaction with a user interface; identifying, in the first user input, a term that matches a stored term with an associated social closeness value, wherein the associated social closeness value indicates a social distance between the user and an entity represented by the stored term; determining, using the first user input, an emotional context associated with the user; generating a feature input based on the first user input, the term, the emotional context, and the associated social closeness value; inputting the feature input into a first machine learning model to obtain a dynamic conversational response from a plurality of dynamic conversational responses based on the feature input; and generating, at the user interface, the dynamic conversational response based on a response selected by the first machine learning model during the conversational interaction.

2. Any of the preceding embodiments, wherein determining the emotional context associated with the user comprises: inputting the first user input into a second machine learning model, wherein the second machine learning model is trained to identify events from user input; receiving, from the second machine learning model, an identifier of an event associated with the first user input; and determining the emotional context associated with the event.

3. Any of the preceding embodiments, wherein generating the feature input based on the first user input, the term, the emotional context, and the associated social closeness value further comprises generating the feature input based on the event.

4. Any of the preceding embodiments, wherein determining the emotional context associated with the event comprises: comparing the event with a list of stored events; identifying, based on comparing the event with the list of stored events, a matching event; and retrieving the emotional context associated with the matching event.

5. Any of the preceding embodiments, further comprising: inputting the first user input into a second machine learning model, wherein the second machine learning model is trained to identify a context from user input; and receiving, from the second machine learning model, an identifier of the context associated with the first user input.

6. Any of the preceding embodiments, wherein inputting the feature input into the first machine learning model to obtain the dynamic conversational response from the plurality of dynamic conversational responses comprises: receiving, from the first machine learning model, a plurality of probable contexts and a plurality of corresponding probabilities; selecting, from the plurality of probable contexts, one or more contexts with highest probabilities; selecting conversational data based on the one or more contexts; and updating the dynamic conversational response with the conversational data.

7. Any of the preceding embodiments, wherein updating the dynamic conversational response with the conversational data comprises: comparing each response term with a plurality of contextual terms; and in response to determining that a response term matches a contextual term of the plurality of contextual terms, replacing the response term with the contextual term.

8. Any of the preceding embodiments, wherein identifying, in the first user input, the term that matches the stored term with the associated social closeness value comprises comparing a plurality of terms within the first user input with a plurality of stored terms, wherein each of the plurality of stored terms is associated with a corresponding social closeness value.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for generating dynamic conversational responses sensitive to different emotional contexts using machine learning models, the system comprising:
one or more processors; and
a non-transitory computer-readable storage medium storing instructions, which, when executed by the one or more processors, cause the one or more processors to:
receive a first user input from a user during a conversational interaction with a user interface of a device associated with the user;
compare a plurality of terms within the first user input with a plurality of stored terms, wherein each term of the plurality of stored terms is associated with a corresponding social closeness value, and wherein a particular social closeness value indicates a social distance between the user and an entity represented by a corresponding stored term;
based on comparing the plurality of terms within the first user input with the plurality of stored terms, determine a term of the plurality of terms that matches a stored term of the plurality of stored terms;
retrieve a social closeness value associated with the term of the plurality of terms;
in response to determining that the social closeness value is above a threshold, determine an emotional context of the first user input;
generate a feature input based on the first user input, the term of the plurality of terms, the emotional context, and the social closeness value;
input the feature input into a first machine learning model, wherein the first machine learning model is trained to select or generate a dynamic conversational response from a plurality of dynamic conversational responses based on the feature input; and
generate for display, at the user interface, the dynamic conversational response selected by the first machine learning model during the conversational interaction.

2. The system of claim 1, wherein the instructions for determining the emotional context of the first user input further cause the one or more processors to:
input the first user input into a second machine learning model, wherein the second machine learning model is trained to identify events from user inputs;
receive, from the second machine learning model, an identifier of an event associated with the first user input; and
determine the emotional context associated with the event.

3. The system of claim 2, wherein the instructions for generating the feature input based on the first user input, the term of the plurality of terms, the emotional context and the social closeness value further cause the one or more processors to generate the feature input based on the event, and the emotional context associated with the event.

4. The system of claim 1, wherein the instructions further cause the one or more processors to:
input the first user input into a second machine learning model, wherein the second machine learning model is trained to identify a context from user input; and
receive, from the second machine learning model, an identifier of the context associated with the first user input.

5. A method for generating dynamic conversational responses sensitive to different emotional contexts using machine learning models, the method comprising:
receiving a first user input from a user during a conversational interaction with a user interface;
identifying, in the first user input, a term that matches a stored term with an associated social closeness value, wherein the associated social closeness value indicates a social distance between the user and an entity represented by the stored term;
determining, using the first user input, an emotional context associated with the user;
generating a feature input based on the first user input, the term, the emotional context, and the associated social closeness value;
inputting the feature input into a first machine learning model to obtain a dynamic conversational response from a plurality of dynamic conversational responses based on the feature input; and
generating for display, at the user interface, the dynamic conversational response based on a response selected by the first machine learning model during the conversational interaction.

6. The method of claim 5, wherein determining the emotional context associated with the user comprises:
inputting the first user input into a second machine learning model, wherein the second machine learning model is trained to identify events from user input;
receiving, from the second machine learning model, an identifier of an event associated with the first user input; and
determining the emotional context associated with the event.

7. The method of claim 6, wherein generating the feature input based on the first user input, the term, the emotional context, and the associated social closeness value further comprises generating the feature input based on the event.

8. The method of claim 6, wherein determining the emotional context associated with the event comprises:
comparing the event with a list of stored events;
identifying, based on comparing the event with the list of stored events, a matching event; and
retrieving the emotional context associated with the matching event.

9. The method of claim 5, further comprising:
inputting the first user input into a second machine learning model, wherein the second machine learning model is trained to identify a context from user input; and
receiving, from the second machine learning model, an identifier of the context associated with the first user input.

10. The method of claim 5, wherein inputting the feature input into the first machine learning model to obtain the dynamic conversational response from the plurality of dynamic conversational responses comprises:

receiving, from the first machine learning model, a plurality of probable contexts and a plurality of corresponding probabilities;

selecting, from the plurality of probable contexts, one or more contexts with highest probabilities;

selecting conversational data based on the one or more contexts; and updating the dynamic conversational response with the conversational data.

11. The method of claim 10, wherein updating the dynamic conversational response with the conversational data comprises:

comparing each response term with a plurality of contextual terms; and in response to determining that a response term matches a contextual term of the plurality of contextual terms, replacing the response term with the contextual term.

12. The method of claim 5, wherein identifying, in the first user input, the term that matches the stored term with the associated social closeness value comprises comparing a plurality of terms within the first user input with a plurality of stored terms, wherein each of the plurality of stored terms is associated with a corresponding social closeness value.

13. A non-transitory, computer readable medium for generating dynamic conversational responses using machine learning models, comprising instructions that, when executed by one or more processors, cause operations comprising:

receiving a first user input during a conversational interaction by a user with a user interface;

identifying, in the first user input, a term that matches a stored term with an associated social closeness value, wherein the associated social closeness value indicates a social distance between the user and an entity represented by the stored term;

determining, using the first user input, an emotional context associated with the user;

generating a feature input based on the first user input, the term, the emotional context, and the associated social closeness value;

inputting the feature input into a first machine learning model to obtain a dynamic conversational response from a plurality of dynamic conversational responses based on the feature input; and generating for display, at the user interface, the dynamic conversational response based on a response selected by the first machine learning model during the conversational interaction.

14. The non-transitory, computer readable medium of claim 13, wherein the instructions for determining the emotional context associated with the user further cause the one or more processors to perform operations comprising:

inputting the first user input into a second machine learning model, wherein the second machine learning model is trained to identify events from user input;

receiving, from the second machine learning model, an identifier of an event associated with the first user input; and determining the emotional context associated with the event.

15. The non-transitory, computer readable medium of claim 14, wherein the instructions for generating the feature input based on the first user input, the term, the emotional context, and the associated social closeness value further cause the one or more processors to generate the feature input based on the event.

16. The non-transitory, computer readable medium of claim 14, wherein the instructions for determining the emotional context associated with the event further cause the one or more processors to perform operations comprising:

comparing the event with a list of stored events;

identifying, based on comparing the event with the list of stored events, a matching event; and retrieving the emotional context associated with the matching event.

17. The non-transitory, computer readable medium of claim 13, wherein the instructions further cause the one or more processors to perform operations comprising:

inputting the first user input into a second machine learning model, wherein the second machine learning model is trained to identify a context from user input; and receiving, from the second machine learning model, an identifier of the context associated with the first user input.

18. The non-transitory, computer readable medium of claim 13, wherein the instructions for inputting the feature input into the first machine learning model to obtain the dynamic conversational response from the plurality of dynamic conversational responses further cause the one or more processors to perform operations comprising:

receiving, from the first machine learning model, a plurality of probable contexts and a plurality of corresponding probabilities;

selecting, from the plurality of probable contexts, one or more contexts with highest probabilities;

selecting conversational data based on the one or more contexts; and updating the dynamic conversational response with the conversational data.

19. The non-transitory, computer readable medium of claim 18, wherein the instructions for updating the dynamic conversational response with the conversational data further cause the one or more processors to perform operations comprising:

comparing each response term with a plurality of contextual terms; and in response to determining that a response term matches a contextual term of the plurality of contextual terms, replacing the response term with the contextual term.

20. The non-transitory, computer readable medium of claim 13, wherein the instructions for identifying, in the first user input, the term that matches the stored term with the associated social closeness value further cause the one or more processors to compare a plurality of terms within the first user input with a plurality of stored terms, wherein each term of the plurality of stored terms is associated with a corresponding social closeness value.

* * * * *